United States Patent Office 3,576,807
Patented Apr. 27, 1971

---

3,576,807
S-(PHTHALAZIN-1-YL)DITHIOCARBAMATES
John J. D'Amico, Dunbar, W. Va., assignor to Monsanto Company, St. Louis, Mo.
No Drawing. Application Oct. 11, 1967, Ser. No. 705,572, now Patent No. 3,454,572, which is a division of application Ser. No. 513,558, Dec. 13, 1965, now Patent No. 3,379,700. Divided and this application Oct. 1, 1968, Ser. No. 766,025
Int. Cl. C07d 51/06
U.S. Cl. 260—250       5 Claims

ABSTRACT OF THE DISCLOSURE

S-(phthalazin-1-yl)dithiocarbamates are described which are useful for accelerating vulcanization of rubber.

---

This is a division of application Ser. No. 705,572, filed Oct. 11, 1967, now U.S. Pat. No. 3,454,572, which is a division of Ser. No. 513,558 filed Dec. 13, 1965, now U.S. Pat. No. 3,379,700.

This invention relates to derivatives of phthalazine. The invention further relates to new chemical compounds useful as vulcanization accelerators in rubber.

An object of this invention is to provide new and useful chemical compounds for industry. A further object of this invention is to promote the progress of science and useful arts. Other objects will become apparent as the description proceeds.

The new compounds of the invention may be represented by the formula

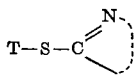

In general, T is a radical having carbon attached to the sulfur shown, which carbon in turn is either singly or doubly linked to nitrogen. T may be thiocarbamoyl. More particularly, T may be

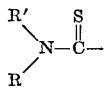

wherein R and R' are lower alkyl, lower cycloalkyl, aryl preferably of the benzene series, or R and R' taken together are an open chain radical which with the nitrogen constitutes a heterocyclic ring which preferably contains at least five members, at least four of which are carbon and not more than one is nitrogen. For example, where the radical

is phthalazin-1-yl, T may be N-alkyl-N-aryl thiocarbamoyl, N,N-(oxapentamethylene)-thiocarbamoyl, N,N-diloweralkyl thiocarbamoyl, or N,N-hexamethylene thiocarbamoyl. In this invention, the term "lower" includes 1 to 8 carbon atoms.

Suitable examples of the compounds of this invention are:

S-(phthalazin-1-yl)N,N-3-oxapentamethylenedithiocarbamate,
S-(phthalazin-1-yl)N,N-diethyldithiocarbamate,
S-(phthalazin-1-yl)N,N-tetramethylenedithiocarbamate,
S-(phthalazin-1-yl)N,N-pentamethylenedithiocarbamate,
S-(phthalazin-1-yl)N,N-hexamethylenedithiocarbamate,
S-(phthalazin-1-yl)N,N-dimethyldithiocarbamate,
S-(phthalazin-1-yl)N,N-diisopropyldithiocarbamate,
S-(phthalazin-1-yl)N,N-dipropyldithiocarbamate,
S-(phthalazin-1-yl)N-methyl N-cyclohexyldithiocarbamate,
S-(phthalazin-1-yl)N,N-dibutyldithiocarbamate, and
S-(phthalazin-1-yl)N-ethyldithiocarbanilate.

The new compounds of this invention are prepared as follows:

The compound S-(phthalazin-1-yl)N,N-3-oxapentamethylenedithiocarbamate is prepared by adding slowly 7.6 grams (0.1 mole) of carbon disulfide to a stirred solution containing 8.7 grams (0.1 mole) of morpholine, 200 ml. of ethyl alcohol, and 16 grams (0.1 mole) of 25% aqueous sodium hydroxide. After stirring at 25°–30° C. for one hour, 16.5 grams (0.1 mole) of 1-chlorophthalazine is added in one portion. The stirred reaction mixture is heated at 75°–80° C. for 24 hours. After cooling to 25° C., 600 ml. of water is added and stirred at 0°–10° C. for 15 minutes. The solid is collected by filtration, washed with water until the washings are neutral to litmus and air dried at 25°–30° C. The product, melting point 153°–155° C., is obtained in an 82.5% yield. After recrystallization from dimethylformamide, the melting point of a sample of the product is 183°–184° C. Analysis of the S-(phthalazin-1-yl)N,N - 3 - oxapentamethylenedithiocarbamate shows 14.37% nitrogen and 22.03% sulfur. Calculated percentages for $C_{13}H_{13}N_3OS_2$ are 14.42% nitrogen and 22.00% sulfur.

The compound S-(phthalazin-1-yl)N,N-diethyldithiocarbamate is prepared in a similar manner as the S-phthalazin-1-yl)N,N-3-oxapentamethylenedithiocarbamate described above except that 7.3 grams (0.1 mole) of diethylamine is used in place of morpholine and the stirred reaction mixture is heated at 50°–60° C. for six hours. After cooling to 25° C., 300 ml. of water and 400 ml. of ethyl ether are added. After stirring for 15 minutes, the separated ether layer is washed with water until neutral to litmus and dried over sodium sulfate. The ether is removed in vacuo at a maximum temperature of 30° C. at 10–12 mm. Hg. The resulting solid is air dried at 25°–30° C. The product, melting point 85°–90° C., is obtained in a 65% yield. After recrystallization from ethyl alcohol, a sample of the product melts at 109°–110° C. Analysis of the S-(phthalazin-1-yl)N,N-diethyldithiocarbamate shows 15.10% nitrogen and 23.93% sulfur. Calculated percentages for $C_{13}H_{15}N_3S_2$ are 15.15% nitrogen and 23.12% sulfur.

The compound S-(phthalazin-1-yl)N,N-hexamethylenedithiocarbamate is prepared in a similar manner as S-(phthalazin-1-yl)N,N - 3 - oxapentamethylenedithiocarbamate described above except that 10 grams (0.1 mole) of hexamethylenimine is used as a reactant in place of morpholine. The product, melting point 140°–143° C., is obtained in a 99% yield. After recrystallization from ethyl alcohol, a sample of the product melts at 153°–154° C. Analysis of the S-(phthalazin-1-yl)N,N-hexamethylenedithiocarbamate shows 13.37% nitrogen and 20.60% sulfur. Calculated percentages for $C_{15}H_{17}N_3S_2$ are 13.85% nitrogen and 21.13% sulfur.

The compound S-(phthalazin-1-yl)N,N-dimethyldithiocarbamate is prepared in a similar manner as S-(phthalazin-1-yl)N,N - 3 - oxapentamethylenedithiocarbamate described above except that 18 grams (0.1 mole) of 25% dimethylamine is used as a reactant in place of morpholine. The product, melting point 122°–127° C., is obtained in an 88% yield. After recrystallization form ethyl alcohol, a sample of the product melts at 150°–152° C. Analysis of the S-(phthalazin-1-yl)N,N-dimethyldithiocarbamate shows 16.34% nitrogen. The calculated percentage for $C_{11}H_{11}N_3S_2$ is 16.85% nitrogen.

The compound S-(phthalazin-1-yl)N,N-diisopropyldithiocarbamate is prepared in a similar manner as S-(phthalazin - 1 - yl)N,N - 3-oxapentamethylenedithiocarbamate described above except that 10.1 grams (0.1 mole) of diisopropylamine is used as a reactant in place of morpholine. The product, melting point 140°–145° C., is obtained in a 39.2% yield. After recrystallization of a sample of the product from an alcohol-acetone mixture, the melting point is 191°–192° C. Analysis of the S-(phthalazin - 1-yl)N,N-diisopropyldithiocarbamate shows 13.54% nitrogen. The calculated percentage for $C_{15}H_{19}N_3S_2$ is 13.76% nitrogen.

The following table illustrates the useful properties of the compounds of this invention as vulcanization accelerators in sulfur-vulcanizable rubber. For the rubber stocks tested and described below, as illustrative of the utility, Mooney scorch times are determined by means of a Mooney plastometer. The time $t_5$ represents the time in minutes required for the Mooney reading to rise five points above the minimum viscosity of the rubber. The known accelerators, MBT and Santocure NS, are included in the data for comparison purposes. MBT designates 2-mercaptobenzothiazole, and Santocure NS is the trademark for N-tert-butyl-2-benzothiazolesulfenamide. The antioxidant Neozone D is included in the stocks. The active ingredient for Neozone D is reported to be N-phenyl-beta naphthylamine.

Table I illustrates rubber cure properties of the compounds of this invention in an A–5 masterbatch. An A–5 masterbatch is composed of:

| | Parts |
|---|---|
| Natural rubber smoke sheets | 100 |
| High abrasion furnace black | 50 |
| Zinc oxide | 3.0 |
| Stearic acid | 2.0 |
| Hydrocarbon softener | 3.0 |
| Saturated polymerized petroleum hydrocarbon | 3.0 |

The stock numbers in Table I contain the following compounds:

Stock—
1. Santocure NS
2. MBT
3. S-(phthalazin-1-yl)N,N-3-oxapentamethylene-dithiocarbamate
4. S-(phthalazin-1-yl)N,N-diethyldithiocarbamate Although dithiocarbamates are not generally delayed action accelerators, S - (phthalazin - 1-yl)N,N-3-oxapentamethylenedithiocarbamate is an exception according to the Mooney Scorch of 10.6 minutes.

TABLE I

| Cure time, mins. at 144° C. | Stock 1 | 2 | 3 | 4 |
|---|---|---|---|---|
| A-5 masterbatch | 161 | 161 | 161 | 161 |
| Neozone D | 1.0 | 1.0 | 1.0 | 1.0 |
| Sulfur | 2.5 | 2.5 | 2.5 | 2.5 |
| Accelerator | 0.5 | 0.5 | 0.5 | 0.5 |
| Mooney Scorch at 135° C. $t_5$ | 10.0 | 5.1 | 10.6 | 4.7 |
| Stress-strain: | | | | |
| Modulus 300, p.s.i. {45 | 2,680 | 2,200 | 1,750 | 2,230 |
| 60 | 2,700 | 2,270 | 1,690 | 2,220 |
| Ultimate tensile strength {45 | 4,250 | 3,510 | 2,770 | 3,460 |
| p.s.i. 60 | 4,000 | 3,220 | 2,590 | 3,590 |
| Ultimate elongation, {45 | 450 | 460 | 420 | 440 |
| percent 60 | 430 | 400 | 400 | 480 |

It is intended to cover all changes and modifications of the examples of the invention herein chosen for purposes of disclosure which do not constitute departures from the spirit and scope of the invention. The matter contained in each of the following claims is to be read as part of the general description of the present invention.

I claim:
1. A compound of the formula

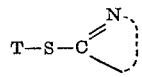

wherein

is phthalazin-1-yl and wherein

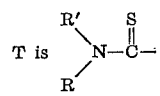

wherein R and R' are independently lower alkyl, cyclohexyl, phenyl, or taken together are an open chain radical which with the nitrogen constitutes a saturated carbon-nitrogen ring or a carbon-nitrogen-oxygen ring having at least five members of which at least four members are carbon and not more than one member is nitrogen.

2. A compound according to claim 1 wherein R and R' are independently lower alkyl.

3. A compound according to claim 1 wherein T is N,N-(oxapentamethylene)thiocarbamoyl.

4. A compound according to claim 1 wherein T is N,N-diethylthiocarbamoyl.

5. A compound according to claim 1 wherein T is N,N-hexamethylenethiocarbamoyl.

References Cited

UNITED STATES PATENTS 3,379,700   4/1968   D'Amico _____ 260—250A
3,454,572   7/1969   D'Amico _____ 260—250A NICHOLAS S. RIZZO, Primary Examiner U.S. Cl. X.R.

260—79.5